Oct. 13, 1970  C. W. DEE  3,533,285

MASS FLOW METER (TIME LAPSE)

Filed Nov. 3, 1967

INVENTOR

COLIN W DEE

United States Patent Office 3,533,285
Patented Oct. 13, 1970

3,533,285
MASS FLOW METER (TIME LAPSE)
Colin William Dee, Bournemouth, England, assignor to Gilbert Colin Davis, Forest Town, Johannesburg, Republic of South Africa
Continuation-in-part of application Ser. No. 557,230, June 13, 1966. This application Nov. 3, 1967, Ser. No. 680,405
Claims priority, application Great Britain, Nov. 4, 1966, 49,472/66
Int. Cl. G01f 1/10
U.S. Cl. 73—231                                    1 Claim

ABSTRACT OF THE DISCLOSURE

A stator and rotor assembly for use in a flowmeter, including first and second fluid mounted rotors, each rotor having blading of a different pitch. The two rotors are resiliently coupled to one another by magnets extending from each rotor and intersecting the field of the magnets on the other rotor in a repulsive relationship. Fluid flow causes a relative angular displacement of the rotors which may be detected by magnetic means as an indication of flow rate.

This application is a continuation-in-part of my copending application Ser. No. 557,230 filed June 13, 1966.

This invention relates to the measurement of mass flow of fluids. One known technique for measurement of mass flow utilises measurement of angular momentum, and a device for carrying this out comprises essentially means defining a flow path for the fluid, a first upstream rotor within the flow path and driven in rotation so as to impart a whirl to the fluid flow, and a second downstream rotor which is acted upon and has a torque applied to it by the whirling fluid flow, this second rotor being restrained and means being provided to measure the angular torque exerted on it. Such a method of measurement of mass flow has the disadvantage that drive must be applied to the upstream rotor, so that the device is relatively complicated. Moreover, as hitherto proposed, such devices have included the driving means and bearings for the upstream rotor, and torque-measuring means and bearings for the downstream rotor, all within the confines of the fluid flow path, resulting in an undesirable relatively high pressure drop across the device when in use.

It is accordingly a main object of the present invention to provide an improved construction of mass flow measuring device wherein upstream and downstream rotors are provided, but wherein both rotors are activated by the fluid flow itself so that no separate external driving agency is required.

A second object of the invention is to provide an improvement whereby bearing means for the upstream and downstream rotors are disposed wholly externally of the rotors, permitting the through-flow path of the rotors to be a smooth and stepless continuation of the fluid flow path.

According to the present invention, apparatus for use in measuring mass flow of fluids comprises stator means defining a flow path for the fluid, a first upstream rotor including blading in said flow path to urge said rotor to be driven in rotation by flow of fluid past said rotor, a second downstream rotor including blading in said flow path to urge said second rotor to be driven in rotation by flow of fluid past said second rotor, the respective blading of the first and second rotors being made such that both of said rotors are urged to rotate in the same direction but each have respective different torques exerted on them by the same mass flow of fluid, means resiliently coupling the rotors for relative angular shifting and such as to exert a restoring force which increases with increase of angular shifting, and means for ascertaining the degree of relative angular shift, away from a norm determined by the resilient coupling means, of the second rotor with respect to the first rotor resulting from a common fluid flow past them.

The principle upon which the instrument operates is as follows:

The two coupled rotors rotate together at an angular velocity which is proportional to the fluid linear velocity $V^1$ in the pipe, acting in this respect as a volumetric flow meter. By virtue of the difference in the form of blades in the two sections and the tendency for them to be drive at different speeds, but constrained not to do so by the resilient coupling, a torque is set up between the two rotors. This torque is principally a function of the product of linear fluid velocity V and mass flow M and results in angular displacement of the two rotors which is directly related to the product M. V. The relative shift of the two rotors is therefore a measure of the product M. V, which in combination with the value of V obtained directly from the common rotational speed of the two rotors yields a measure of the mass flow M. The instrument therefore measures simultaneously both the linear fluid velocity V and the mass flow M from which can be derived in turn the mean fluid density.

The means for ascertaining the degree of relative angular shift of the second rotor with respect to the first rotor may comprise means for determining the time lapse occurring between the passing of respective datum points by portions of the respective rotors which would otherwise pass their respective datum points at the same instant if no shift were present. In a convenient arrangement, the time lapse may be determined electrically, and may be evaluated against a suitable quantity such as a time base. For example, each rotor may be caused to originate a respective electrical signal having a frequency dependent upon the speed of rotation, the shift in time of the respective signals being evaluated by reference to a time base.

The resilient coupling between the upstream and downstream rotors is any that will exert a restoring force, increasing with incerase of angular shift, on one rotor with respect to the other. In one form, a spring may be coupled between the rotors, e.g. a coaxial coiled spring having one end coupled to one rotor and the other end coupled to the other rotor. In another form, the rotors each carry magnetic elements so arranged that the rotors tend, in the absence of other relative angular shifting force, to assume a predetermined angular relative position.

In order to interfere as little as possible with the flow of fluid through the device, the rotors preferably each have a bore which is a smooth and stepless continuation of a flow path defined in the stator means. In particular, the rotors may be arranged so that the downstream rotor follows immediately after the upstream rotor with a bore of the same diameter. Preferably, these rotors are each carried in the stator means by bearing means which are disposed wholly radially outwardly of the fluid flow path, and in an advantageous construction, the rotors are each carried in the stator means by external journal fluid bearings so that an extremely small coefficient of friction is involved. Further, the rotors may each be supported against axial thrust by fluid bearing means, and where one rotor follows immediately on the other, a fluid bearing may be provided between adjacent end surfaces of the two rotors. The fluid supplied to such gas bearings may be allowed to bleed into the fluid flow, because the quantity of fluid involved is so low as to be negligible.

In order that the nature of the invention may be readily ascertained, two embodiments of mass flow measuring device in accordance therewith are hereinafter particularly described with reference to the figures of the accompanying drawing, wherein.

Figure 2:
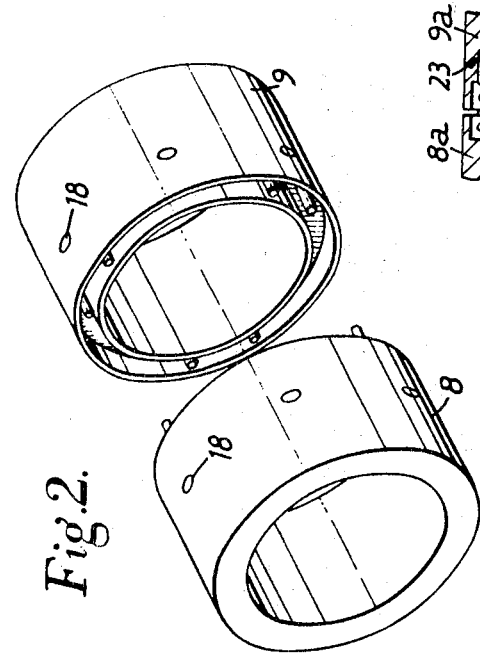
FIG. 2 is a perspective view of two rotors, shown in axially spaced position to reveal in full the magnets of FIG. 1.
Figure 1:
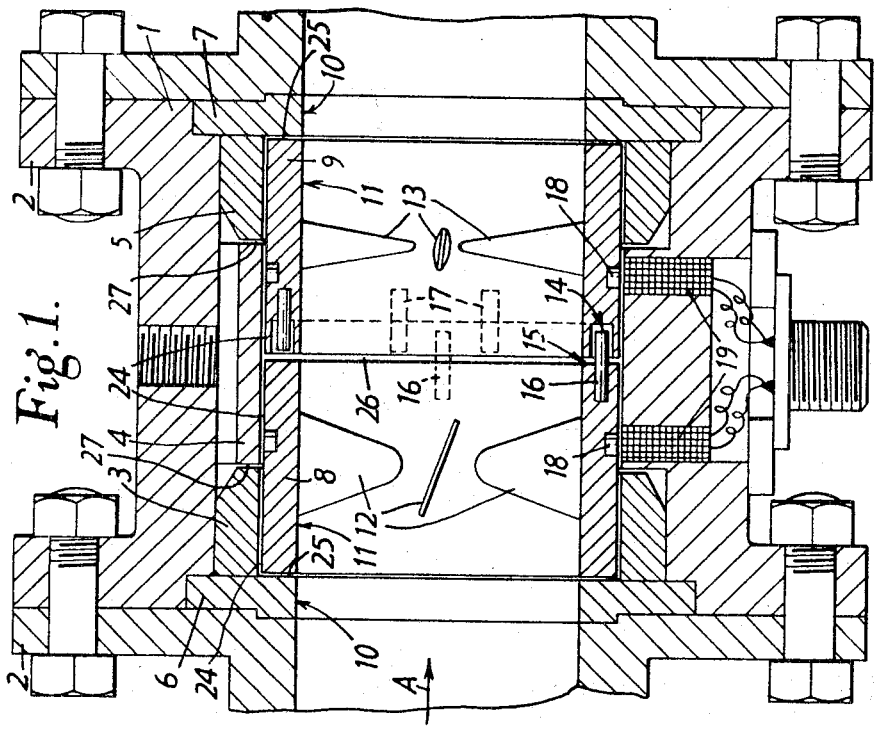
FIG. 1 is an axial section of a first embodiment utilising mutually repellant magnets as a resilient coupling between two rotors.

Referring to FIGS. 1 and 2, the device comprises a stator housing 1 having flanges 2 for attachment to similar flanges on the end of fluid conduits (not shown). Within the housing 1 there is disposed an assembly of three bearing "outer" elements 3, 4 and 5 which are located in position by end rings 6 and 7. The bearing outers elements and the end rings together define journal fluid bearing gaps 24 and axial thrust fluid bearing gaps 25 with an upstream rotor tube 8 and a downstream rotor tube 9, and an axial thrust fluid bearing gap 26 is defined between adjacent ends of the two rotors. Angularly spaced apertures 27 are provided in circumferential rows in the bearing outers to feed pressurized fluid to the bearing gaps. The axial thrust bearing gaps 25 at the outer end of each rotor, and the common bearing gap 26 between the adjacent ends of the rotors, being fed by bleed from the journal gaps 24.

The bore 10 of the end rings is made to correspond to that of the fluid conduits to be connected, and the bores 11 of the two rotors also corresponds to that of the rings.

The upstream rotor 8 has internal blades 12 set at a selected angle to the fluid flow, and the downstream rotor 9 has circular section spokes or blades 13 set at a different angle.

The rotors are caused to rotate by a fluid flow in the direction of arrow A at a speed proportional to the fluid velocity, the difference in the torque exerted on them being proportional to the mass flow multiplied by the fluid velocity.

The downstream rotor 9 is machined at its internal end face with an annular groove 14, whilst the adjacent end face 15 of the upstream rotor 8 is lapped. The outer end face of each rotor is also lapped. The face 15 is then drilled with three axially arranged holes at 120° intervals and circular magnets 16 of the same polarity are inserted in these holes so as to protrude well into the groove 14. In the base of the groove 14 there are drilled three spaced pairs of holes set with their median lines 120° apart, and magnets 17 are inserted in these holes. The polarity of the magnets 17 is the same as that of the magnets 16 so that they will repel mutually. Each magnet 16 is positioned between a pair of magnets 17, and accordingly in the absence of other forces the two rotors tend to take up a relative angular position in which each magnet 16 is symmetrically disposed between the associated magnets 17. The two rotors also each have a series of six or more other magnets 18 inserted at equally spaced intervals about the circumference of the rotors, and these co-operate with inductance coils 19 mounted in the housing 1. By an electronic circuit of conventional nature, not illustrated here, the output signals of the two rotors can be compared with a time base, e.g. on an oscilloscope, and the period elapsing between the signal of the downstream rotor as compared with that of the upstream rotor is a function of the product of fluid flow rate and mass flow rate. The rotors rotate at a speed which is proportional to the fluid velocity flow rate, and which is also conveniently measured in relation to a time base so that the two measurements may easily be combined to produce the required value of mass flow.

In operation, the two rotors are supported totally by (a) a journal fluid bearing, and (b) axial thrust bearings, at one end with respect to an end ring, and at the other end with respect to the other rotor.

Figure 3:
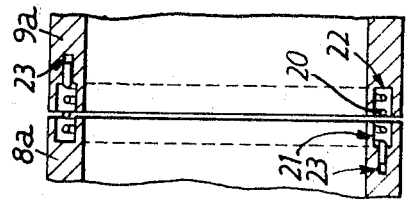
FIG. 3 is a partial axial section to show a modification in which a coiled spring is used as a resilient coupling between two rotors.

Referring now to FIG. 3, there is shown a modification wherein the two rotors are coupled by a coiled spring instead of by magnets. The spring is inserted in opposed annular grooves 21, 22 machined in the adjacent end faces of the rotors 8a, 9a, the tips of the spring being turned at 90° and inserted in small bores 23 in the respective rotor. The grooves 21, 22 are axially deep enough each to accommodate half of the total axial length of the coiled spring. Similarly to the construction of FIG. 1, the rotors are again supported wholly by a journal fluid bearing, and by axial thrust fluid bearings at their respective outer ends and between the adjacent inner ends of the two rotors.

I claim:

1. A stator and rotors assembly, for inclusion in a flow meter, comprising a stator having an upstream cylindrical internal surface and an axially-spaced coaxial downstream cylindrical internal surface of the same radius as said upstream surface; an upstream rotor and a downstream rotor disposed in axially spaced relationship between said internal stator surfaces, said upstream rotor and said downstream rotor each having a respective cylindrical internal surface coaxial with and of the same radius as said internal stator surfaces, said internal stator surfaces and said internal rotor surfaces together defining a flow path for fluid through said rotors and said stator, said flow path thereby being linear and stepless and of constant cross-section throughout, each said rotor being supported in said stator for rotation about an axis coincident with the axis of said internal surfaces of said stator and rotors, by a respective fluid bearing disposed wholly radially outwardly of said internal surfaces; blading mounted on each rotor and positioned radially inwardly of the internal surface of the rotor; and means resiliently coupling said rotors to each other and permitting relative angular shifting of the rotors about their axis of rotation and adapted to exert a restoring torque which increases with increase of relative angular shift, said means comprising at least a pair of permanent magnets carried at circumferentially spaced positions on one of said rotors and with their like poles adjacent, and for each such pair of permanent magnet carried by the other of said rotors and having its like pole positioned between, and in repulsive relation with, the poles of said pair of magnets.

References Cited

UNITED STATES PATENTS

| | | | |
|---|---|---|---|
| 2,975,635 | 3/1961 | Kindler | 73—194 |
| 3,224,271 | 12/1965 | Ichihara | 73—229 |
| 3,144,769 | 8/1964 | Francisco | 73—231 |
| 3,043,143 | 7/1962 | Hollman | 73—231 |
| 2,642,740 | 6/1953 | Stephenson | 73—134 |

FOREIGN PATENTS 945,366 12/1963 Great Britain.

RICHARD C. QUEISSER, Primary Examiner

J. WHALEN, Assistant Examiner

U.S. Cl. X.R.

73—194